Dec. 9, 1969  M. N. HART  3,482,847
TRAILER GUIDE WHEEL CONSTRUCTION
Filed Jan. 30, 1968
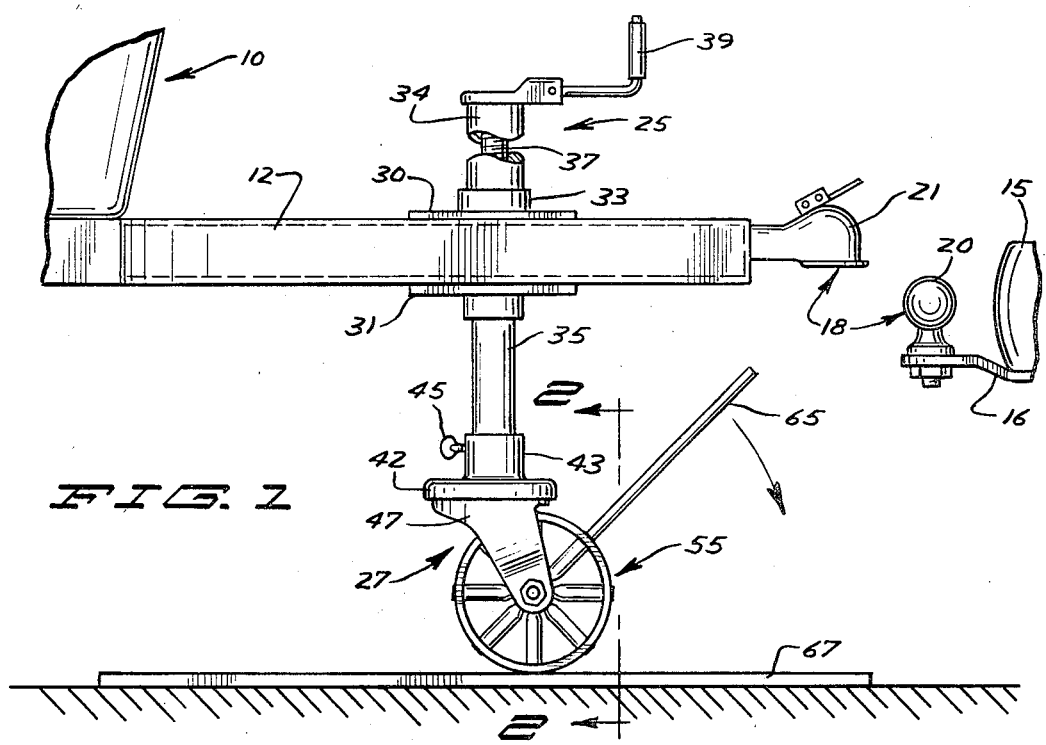
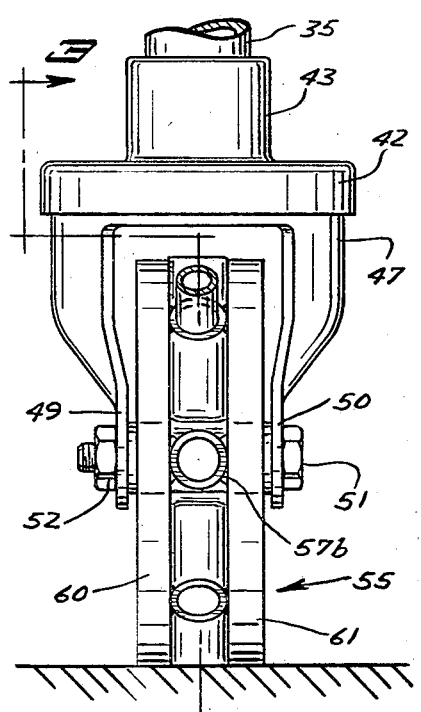
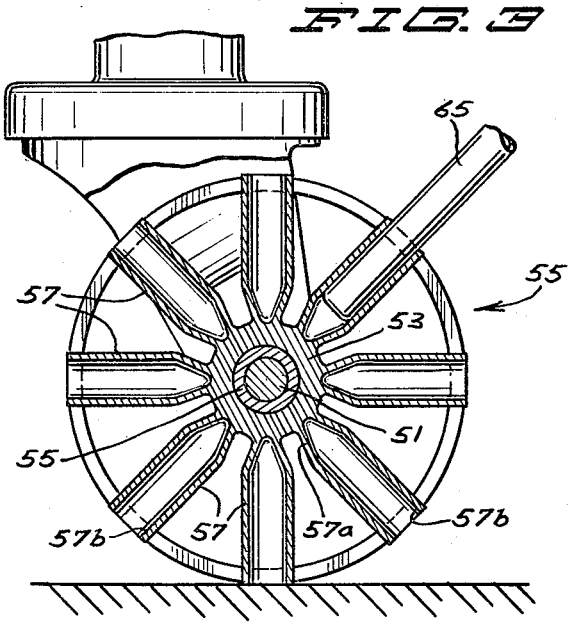
INVENTOR.
MARVIN N. HART
BY Reifand Gregory
ATTORNEYS United States Patent Office 3,482,847
Patented Dec. 9, 1969

3,482,847
TRAILER GUIDE WHEEL CONSTRUCTION
Marvin N. Hart, Merrifield, Minn. 56465
Filed Jan. 30, 1968, Ser. No. 701,624
Int. Cl. B60d 7/00; B60s 9/18
U.S. Cl. 280—3
3 Claims

ABSTRACT OF THE DISCLOSURE

A guide wheel for a house trailer consisting of a caster, the wheel of said caster comprising spaced rim portions, a plurality of spokes extending radially from a hub between said rim portions and being integral therewith, said spokes comprising open-ended tubular portions extending to the peripheries of said rims and a removable leverage bar having a portion thereof disposable into said spokes.

BACKGROUND AND SUMMARY OF THE INVENTION

Particular reference is had to a two wheel type of house trailer which is hitched to the rear of a motor vehicle for movement. When stationary or parked, the front end of said trailer is generally supported by a caster underlying a centrally positioned trailer hitch and blocks are generally placed under the front corner portions of the trailer.

When a vehicle is backed up to engage the trailer hitch with its bumper hitch, precise maneuvering is required. The vehicle may be required to back up several times for alignment for hitching. To accommodate this situation, a caster wheel is provided by means of which with the use of a lever bar disposed into a spoke of the wheel, the caster wheel is then rotated and turned to move the trailer sufficiently to align the trailer hitch with its complementary vehicle bumper hitch. The trailer may be readily moved on the order of one or two feet or more for engagement of the hitch portions.

Separate dollies are known to be used and such dollies require storage. A commercially known device consists of a pair of disc-like pads pivotally connected to a common connecting member and these are manipulated with the use of a bar. The Patent No. 1,631,900 to Temperley shows the use of a wheel having a bar fastened to the outer end of the wheel axle and the rim of the wheel having open transverse notches for locking engagement of the bar with the wheel rim.

It is an object of this invention to provide a caster in connection with the hitch of a trailer to provide ready maneuverability for connection with the bumper hitch of a vehicle.

It is more specifically an object of this invention to provide a caster underlying a trailer hitch to provide movable support for the trailer, said caster including a wheel having spokes between adjacent rim portions, said spokes comprising hollow members open at their free ends to receive the end portions of a jack bar whereby said wheel is readily moved for alignment and engagement of the trailer hitch with the bumper hitch of a vehicle for moving said trailer.

These and other objects and advantages of the invention will be set forth in the following description made in connection with the accompanying drawings in which like reference characters refer to similar parts throughout the several views and in which—

FIG. 1 is a broken view showing the hitch of a trailer and an underlying supporting caster assembly;

FIG. 2 is a broken view in front elevation and partially in vertical section taken on line 2—2 of FIG. 1 as indicated; and FIG. 3 is a broken view partially in vertical section taken on line 3—3 of FIG. 2 as indicated.

DESCRIPTION OF A PREFERRED EMBODIMENT

Referring to the drawings, the forward or front end portion 10 of a house trailer is merely indicated, and extending forwardly thereof is a conventional trailer hitch 12.

Also indicated in connection with said trailer is the rear end portion of a motor vehicle 15 showing an extended bumper hitch 16. For connection of said trailer hitch with said bumper hitch, there is shown a commonly used ball and socket hitch of coupler 18 consisting of a ball 20 carried by said bumper hitch, and a socket 21 carried by said trailer hitch. Said socket in a conventional manner is adapted to receive and be secured about said ball.

In an operating association with said trailer hitch is a hoist or parking jack 25 with a caster 27.

Said trailer hitch 12 is substantially rectangular in cross section and said parking jack in being mounted thereon and secured thereto has bracket plates 30 and 31 overlying and being integral with the upper and lower sides thereof, and a hub portion 33 extends therethrough and an extension 34 thereof extends thereabove. Depending from said hub portions is a telescopic hoist or jack post 35 raised and lowered by a screw rod 37 disposed through said hub portion and its extension and operated by the handle 39. As is well known in the art, the screw rod is rotatably secured against axial travel by a conventional thrust washer carried in said hub portion and engages a threaded anchored nut or equivalent in the upper portion of said post. Thus the hoist post is raised and lowered by the manual rotation of the screw rod 37 by means of the handle 39. The details of the structure indicated are not fully shown as they represent conventional structure.

Removably secured to the lower end of said hoist post 35 is said caster 27. Said caster comprises a common type of bearing swivel 42 having an upstanding cylindrical socket 43 to receive said hoist post and having threaded into its side wall is a set screw 45 formed as a thumb screw.

Depending from said swivel is a fork 47 having spaced apertured portions 49 and 50 having a headed shaft 51 therebetween secured by a nut 52. Mounted on said shaft is a wheel 55 which represents the essential subject matter of the invention herein. Said wheel comprises a hub 53 having a bushing 55 disposed therein and adapted to be journaled onto said shaft 51 which comprises the bearing surface.

Extending radially from said hub are a plurality of spokes 57. Said spokes are integral with said hub as by welding and are tubular in form having tapered inner end portions 57a where joined to said hub and having open free end portions 57b. Said spokes may be circular or noncircular in cross section.

Disposed at either side of said spokes in parallel relationship are a pair of circular rims 60 and 61 secured to either side of said spokes adjacent the ends thereof as by welding whereby said rims and spokes are an integral structure and define a common periphery.

Said spokes 57 are conveniently of a size to receive the end portion of a common type of jack handle here indicated by the reference numeral 65.

Normally, with the trailer in parked position, said wheel 55 will rest on a suitable board 67.

The operation of the device herein is quite obvious. When it is desired to move the trailer, the pulling vehicle will be backed up to within close proximity of the trailer hitch with particular reference to the socket 21. The trailer is readily movable by inserting a jack handle as shown and using it as a lever bar to rotate the wheel 55 forwardly or rearwardly and there is freedom of movement throughout 360 degrees. Thus the socket will be aligned with said ball 20. The caster will then be raised and the socket will fit over and receive said ball and will then be secured thereto. The caster will be raised sufficiently to provide road clearance or if desired, it may be removed.

Thus it is seen that I have provided a simply constructed and efficient means for readily maneuvering a trailer for engagement with a bumper hitch.

It will of course be understood that various changes may be made in the form, details, arrangement and proportions of the parts, without departing from the scope of the invention herein which, generally stated, consists in a device capable of carrying out the objects above set forth, in the parts and combinations of parts disclosed.

What is claimed is:

1. In connection with a house trailer having a forwardly extending hitch,
   a caster underlying said hitch, said caster comprising
   a wheel,
   said wheel having a hub,
   a plurality of spokes extending radially of said hub and being integral therewith,
   said spokes being formed to be tubular in cross section and having open free end portions, and
   a pair of spaced rims at either side of said spokes and being integral therewith and having a common periphery therewith.

2. The structure set forth in claim 1, including
   a bar in connection with said wheel, and
   said bar having a portion disposable into the free end portions of said spokes for the exertion of leverage to move said wheel.

3. The structure set forth in claim 1, including
   a trailer hitch jack,
   said jack being secured to said hitch, a hoist bar carried by said jack,
   means carried by said jack for raising and lowering said hoist bar, and
   said caster having swivel means to receive said hoist bar.

References Cited

UNITED STATES PATENTS

| 1,297,631 | 3/1919 | Allen | 301—53 X |
| 1,625,161 | 4/1927 | Roos | 280—3 |
| 1,631,900 | 6/1927 | Temperley | 280—3 |
| 3,183,013 | 5/1965 | Brown | 280—3 |

LEO FRAGLIA, Primary Examiner

U.S. Cl. X.R.

280—150.5, 475, 478; 301—33